United States Patent [19]

Corrigan

[11] Patent Number: 4,549,309
[45] Date of Patent: Oct. 22, 1985

[54] RADIO TRANSMITTING AND RECEIVING APPARATUS

[76] Inventor: Nigel M. Corrigan, 25 Hyde Park Gate, Seletar Airbase, Singapore, 2879

[21] Appl. No.: 545,611

[22] Filed: Oct. 18, 1983

Related U.S. Application Data

[63] Continuation-in-part of Ser. No. 482,507, Apr. 6, 1983, abandoned, which is a continuation of Ser. No. 296,181, Aug. 25, 1981, abandoned.

[30] Foreign Application Priority Data

Aug. 28, 1980 [GB] United Kingdom ............... 8027863

[51] Int. Cl.[4] .............................................. H04B 1/44
[52] U.S. Cl. ........................................ 455/78; 455/58
[58] Field of Search ............... 455/58, 78, 79, 82, 455/83, 98; 370/31, 32

[56] References Cited

U.S. PATENT DOCUMENTS 2,721,935 10/1955 Dorff ................................... 455/58
4,082,919 4/1978 Day et al. ............................ 455/58

Primary Examiner—Marc E. Bookbinder
Attorney, Agent, or Firm—Michael J. Striker

[57] ABSTRACT

A simplex radio transmitting and receiving apparatus, has a transmission blocking means which prevents selection of the transmitting mode of the apparatus if a signal of predetermined strength is being received by the apparatus at the time the press-to-talk key is operated. An over-ride circuit enables the blocking means to be disabled in an emergency or if another transmitter has been left operating in error. The over-ride circuit can be activated by, for example, repeated operation of the press-to-talk key, and ceases to operate when the key is released to return the apparatus to its receiving mode. Also disclosed is a transmission control means which can be used to modify existing transceivers to operate in accordance with the invention. In a further feature of the invention, means are provided to detect the higher power consumption of the transceiver in the transmit mode and thereby to give a warning of an unduly extended transmission, e.g. by faulty equipment.

6 Claims, 4 Drawing Figures

RADIO TRANSMITTING AND RECEIVING APPARATUS

CROSS REFERENCE TO A RELATED APPLICATION

This application is a continuation-in-part application of application Ser. No. 482 507, filed on Apr. 6, 1983, now abandoned, which is a continuation application under Rule 1.62 of application Ser. No. 296 181, filed on Aug. 25, 1981 now abandoned.

FIELD OF THE INVENTION

This invention relates to a radio transmitting and receiving apparatus and to a transmission control means for use in a radio transmitting and receiving apparatus. The apparatus is particularly applicable to aircraft voice communications.

BACKGROUND OF THE INVENTION

Aircraft air-to-ground and ground-to-air voice radio communications take place within the VHF band. Airliners are equipped with dual VHF transmitter/receivers ("transceivers") allowing a choice of any two of 720 channels spaced at 25 kHz in the range 118 to 136 MHz, and ground facilities communicate with aircraft on any single channel in that range. It is, therefore, quite normal to have as many as eight aircraft with their transceivers operating on a single VHF channel, i.e. that of a ground facility such as air traffic control.

A problem which arises from such a situation is that if two transmitters operate at the same time on the same channel, any receivers tuned to that channel will receive either a jumble of words or a high pitched whistle. The operators of the two transmitters will be unaware that their transmissions are interfering one with the other. While this typically causes no more than a minor nuisance, with a request for each message to be repeated separately, it can cause messages to be misunderstood, with possibly disastrous consequences.

To overcome this type of problem, it has been proposed to include blocking means arranged to prevent transmission of a signal by the apparatus while a signal of predetermined strength is being received by the apparatus. Apparatus of this type is disclosed in U.K. Patent Specification No. 1 480 418 in the name of Budapesti Radiotechnikai Gyar. However, in an emergency, or where it is apparent that another transmitter has been left operating in error, some means of over-riding the operation of the blocking means is required. In Budapesti U.K. Patent Specification No. 1 480 418, reference is made to switching the apparatus to an operational mode in which the blocking means is made ineffective. It will be apparent that such a provision might well render the provision of a blocking control circuit in radio transceivers ineffective as a way of overcoming the original problem of preventing interfering sumultaneous transmissions, since it is possible that many transceivers would be left permanently switched to the operational mode in which the blocking means is ineffective, either by oversight or even deliberately. This is particularly true in the case of aircraft radio apparatus, where the inconvenience or even potential danger in having to operate a control on the transceiver set would dissuade aircrew from repeating the operation to cancel the over-ride when not required.

SUMMARY OF THE INVENTION

The present invention overcomes this problem by providing in a simplex radio transmitting and receiving apparatus, comprising a selector switch, operation of which causes the apparatus to change from a receiving mode into a transmitting mode, transmission blocking means arranged to prevent selection of the transmitting mode if a signal of predetermined strength is being received by the apparatus at the time the selector switch is operated, and an over-ride circuit whereby operation of the transmission blocking means may be selectively over-ridden to enable the transmitting mode to be selected, the improvement which comprises means for generating a control signal, means within said over-ride circuit responsive to said signal to initiate operation of said over-ride circuit, and means within said over-ride circuit responsive to return of said selector switch to select the receiving mode of the apparatus to terminate operation of said over-ride circuit.

The control signal can be generated by repeated operation of the selector switch, or press-to-talk button, for example within a predetermined time interval, or by operation of a separate over-ride switch.

The blocking means may also be arranged to continue to prevent selection of the transmitting mode if the received signal ceases while the selector switch is being operated to select the transmitting mode, thereby preventing a user of the apparatus from gaining priority to transmit, when the existing transmission ceases, by holding the selector switch, or press-to-talk key, in the transmitting mode position.

The invention also provides a transmission control means for a simplex radio transmitting and receiving apparatus comprising:

- a switching means connectable between the transmit press-switch and a transmitter control circuit of said apparatus;
- a detector connectable to the receive circuit of said apparatus, the detector being operably connected to said switching means and arranged to detect receipt of a signal by the receiver, whereby when a signal is detected the detector causes the switching means to open the circuit between the press-switch and the transmitter circuit until said signal is no longer detected; and
- an over-ride circuit which comprises control signal detecting means, an over-ride control circuit, and mode-detecting means, the over-ride control circuit being activated by the control signal detecting means upon receipt of a control signal to over-ride operation of the switching means by the detector to close again the circuit between the press-switch and the transmitter circuit, the mode-detecting means detecting the mode in which the apparatus is operating, and serving to de-activate the over-ride control circuit when a return to the receiving mode is detected.

An advantage of the apparatus of the invention is that it can only be operated to over-ride the transmission blocking means until the over-riding transmission is finished. The apparatus cannot be left in an over-ride mode.

The transmission control means of the invention can be readily installed in existing VHF transceivers and will not affect the operation of the VHF transceiver in any other way. As the necessary circuitry can be incorporated into a micro-electronic circuit, the additional weight of the modified radio is negligible, an important factor in aircraft. If the control means fails for any reason to operate, the radio reverts to its former state, operating as if the device were not present. Modification of a single unit gives the aircraft the advantages of the invention even if no other unit on any other aircraft has been modified, without affecting the operation of any other radio apparatus. Any modification can be made within a removable radio unit outside the aircraft, with no alteration to aircraft wiring. Modification can be by way of a plug-in attachment to the existing radio equipment. Retraining of aircraft crews is not necessary, since operation of the modified units is essentially the same as before modification.

An additional problem which can arise, particularly in aircraft radio communications, is the problem of the "stuck microphone", where a transmitter continues to operate, either through a fault or through a press-to-talk switch being inadvertantly pressed, thus interfering with or blocking other radio transmissions on the same frequency. A further feature of the present invention prevents or reduces the risk of the problem occurring.

According to this further feature, there is provided in a simplex radio transmitting and receiving apparatus comprising a power supply and radio transmitter and receiver circuits connected thereto, the improvement comprising current monitoring means between said power supply and said transmitter and receiver circuits, said current monitoring means being connected to warning means and being arranged to give a first output signal to said warning means when the current monitored corresponds to that required by activation of said transmitter circuit, and to give a second output signal to said warning means when the current monitored corresponds to that required by activation of said receiver circuit, said warning means including switching means responsive to said first output signal to operate a warning device.

Preferably, a delay circuit is provided between said switching means and said warning device so that said warning device only operates after the transmission has been proceeding for a predetermined time. This avoids the danger of the operator becoming so accustomed to seeing the warning that he does not react to it when the transmission time becomes extended. Typically, the warning device will be a light or an illuminable panel comparable with conventional warning devices within an aircraft cabin. Additionally, or alternatively, the warning device may comprise a sound generating device.

It will be seen that, by drawing the operator's attention to the fact that the transmitter is functioning, the apparatus will prevent inadvertant extended transmissions which may interfere with other operators on the same frequency.

DETAILED DESCRIPTION OF THE PREFERRED EMBODIMENTS

Figure 1:
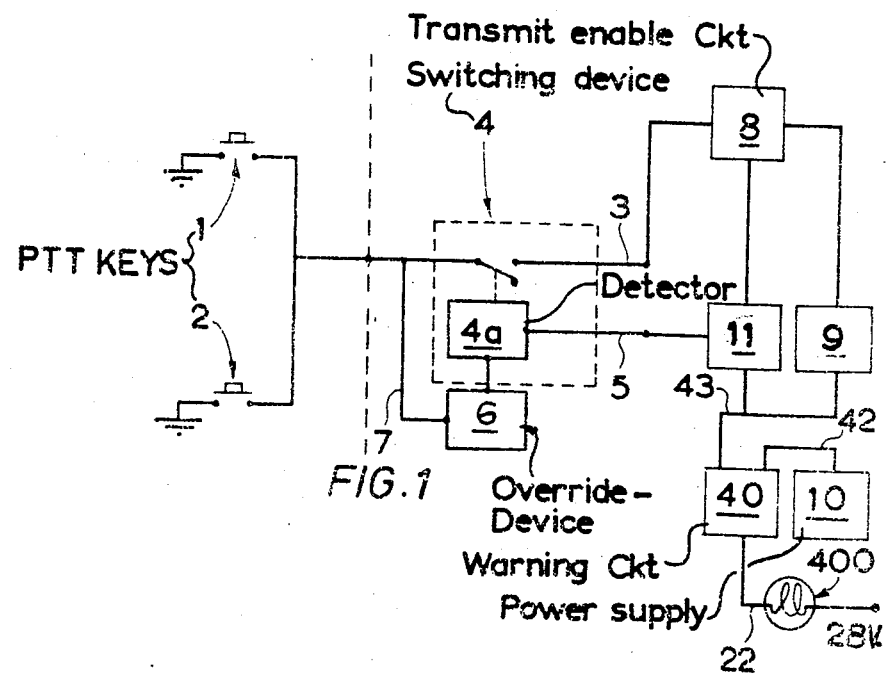
FIG. 1 is a schematic diagram of part of an aircraft VHF radio apparatus in accordance with the invention, illustrating the general principle by which apparatus operates.

In FIG. 1, the transmission control means is shown as having been operated to prevent operation of the transmitter. The transmitter circuit 9 of the apparatus is caused to operate by operation of a transmit-enable circuit 8 which is connected via line 3 to two press-switches 1 and 2, connected in parallel, which are the captain's and co-pilot's "press-to-talk" keys, closure of either of which causes grounding of the line 3 and hence activation of the transmit-enable circuit to enable the transmitter to operate. When the press-to-talk keys 1 and 2 are both open, the transmit-enable circuit 8 permits the receiver circuit 11 of the apparatus to operate. The receiver and transmitter circuits each draw power from a power supply 10, which may be the aircraft's 28 volt DC power supply, via lines 42 and 43 connected to an unintentional transmission warning circuit 40, described hereinafter in detail with reference to FIG. 4, which serves to illuminate a warning light 400, connected via line 22, when the transmitter circuit has been operating for more than a predetermined time interval.

A switching device 4 is connected in the line 3 so as to be able to make or break the line 3 selectively. When the line 3 is broken, the "press-to-talk" keys 1 and 2 are prevented from operating the transmitter. The switching device 4 includes a detector 4a, hereinafter described in detail with reference to FIGS. 2 and 3, connected through a line 5 to the intermediate frequency stages of the receiver. The switching device 4 is arranged to operate when the detector 4a detects the presence of a received signal in the receiver circuit, breaking the contact between the "press-to-talk" keys 1 and 2 and transmitter circuit.

An over-ride device 6 is connected to the switching device 4, and has a connection 7 to the common line to the keys 1 and 2. The over-ride device 6 is arranged to detect two operations of either of the keys 1 and 2 within a predetermined time period and to cause reset of the switching device 4 to close the line 3 on the second operation of the key after the switching device 4 was ativated to open the line 3. Thus, only if the blocking transmissin from another transmitter continues will the second operation of the key serve to over-ride the switching device. If the transmission ends and restarts after the first operation of the key, further operations of the key will be necessary to over-ride the switching device 4.

While the switching device 4 is represented in the diagram as an electro-mechanical relay, it will be appreciated that the switching may readily be effected electronically. Electronic circuits will also be suitable for the over-ride device 6.

In aircraft radio, a "side-tone" is fed by the apparatus to the captain's and co-pilot's head sets during transmission so that they may hear their transmission. It will be seen that, if the transmitter is prevented from operating, the received signal will continue to be heard when speaking into the transmitting microphone, immediately indicating that the switching device has operated.

Figure 2:
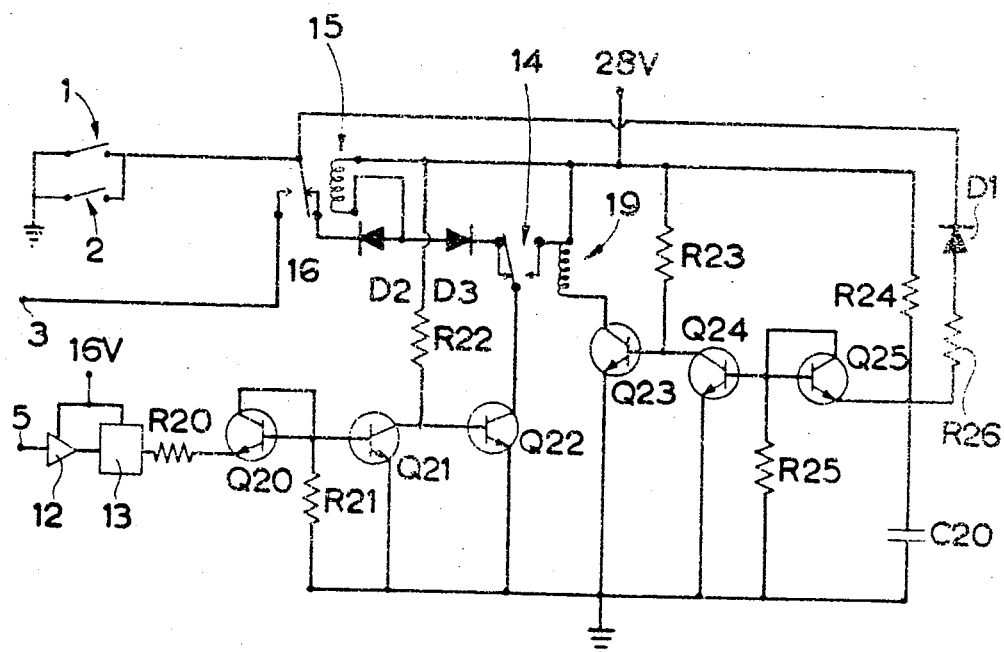
FIG. 2 is a more detailed diagram of a preferred embodiment of the apparatus illustrated in principle in FIG. 1.
Figure 3:
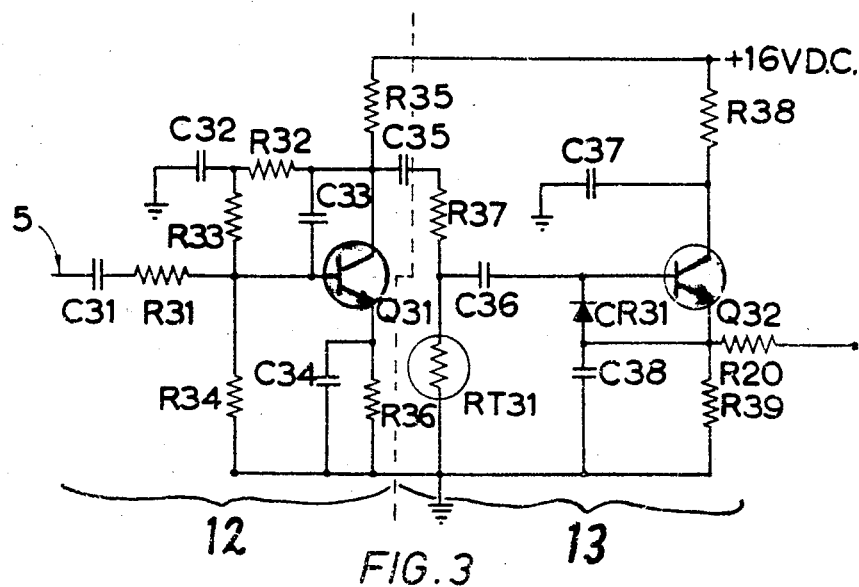
FIG. 3 is a detailed circuit diagram of two components shown in block form in FIG. 2.

Referring now to the specific apparatus illustrated in FIGS. 2 and 3, the input line 5 is connected to the detected output of the intermediate frequency stages of the receiver portion of the transceiver, for example the selective calling output of an airborne "ARINC" transceiver.

The input line 5 is connected to a detector (4a in FIG. 1), comprising a noise amplifier 12 and a carrier squelch gate 13, which are identical with circuits found within airborne "ARINC" transceivers, and are described in detail hereinafter with reference to FIG. 3. The noise amplifier 12 and carrier squelch gate 13 are together arranged to produce an output at 16 volts DC when noise is input at 5, and an output at 0 volts DC when signal carrier is input at 5, indicating that a transmission is being received. The output of the squelch gate 13 leads to a relay driver which is a simple electronic switch arranged to open when the input is at 16 volts from the squelch gate and to close, giving a path to ground, when the input is at 0 volts from the carrier squelch gate.

The relay driver includes a first transistor Q20 (2N 2222), connected to the carrier squelch gate 13 via a 3.3 kΩ resistor R20 and with base and collector strapped together so that the transistor acts as a diode with automatic temperature compensation via the next stage. This first transistor Q20 thus acts to ensure that the second relay 15 is only activated by the 16 V signal from the squelch gate 13. The 16 V signal from the squelch gate 13 causes a second transistor Q21 (2N 3700) to conduct, thus allowing current to flow, via 10 kΩ resistor R22, from the 28 V supply to ground. The consequent drop in potential at the base of a third transistor Q22 (2N 3700), connected between a first of the contacts 14 of the first relay 19 and ground, causes this to cease conducting, thus effectively "switching off". The second of the contacts 14 of a first relay 19 is connected via a protective diode D2 to the coil of a second relay 15, which is connected in turn to the 28 volt aircraft power supply.

The contacts 16 of the second relay 15 are connected in the line 3 between the press-to-talk switches 1 and 2 and the transmit-enable circuit 8 (FIG. 1).

The first relay 19 is connected to the aircraft 28 volt power supply and to ground via a time delay circuit.

The time delay circuit is essentially similar to the relay driver circuit as hereinbefore described, but includes a capacitor C20 in series with a 220 kΩ resistor R24 to give a time delay. Transistor Q25 (2N 2222) has the collector strapped to the base to act as a diode with temperature compensation in a similar manner to transistor Q20. The transistor Q25 is connected between the base of transistor Q24 (2N 3700), which is also connected via 100 kΩ resistor R25 to ground, and the press-to-talk switches 1 and 2 via a 470Ω resistor R26 and protective IN645 diode D1. Transistor Q25 is also connected at its emitter to ground via capacitor C20 (10μF) and to the 28 V power supply via resistor R24 (220 kΩ). Closure of either of switches 1 and 2 grounds the line to the emitter of transistor Q25 and also discharges the capacitor C20.

The drop in potential at the base of transistor Q24 causes this transistor to cease to conduct in the line from the 28 V power supply via 22 kΩ resistor R23 to ground. The collector of transistor Q24 is also connected to the base of transistor Q23 (2N 3700), whose collector is connected to the 28 V power supply via the coil of the first relay 19 and whose emitter is connected to ground. Thus the increase in potential at the base of transistor Q23 due to transistor Q24 ceasing to conduct causes transistor Q23 to conduct, thus energising the first relay 19.

When the circuit to ground via switch 1 or 2 is opened again, transistor Q24 does not begin to conduct, thus causing transistor Q23 to cease conducting, until the potential at its base reaches a predetermined level, and the time taken for this to happen is dependent on the capacitance of the capacitor C20 and resistance of resistor R24. In practice, a delay of approximately 1 second occurs before the relay 19 is de-energised, allowing contacts 14 to close again.

Thus, operation of either of the press-to-talk switches 1 and 2 causes current to flow from the power supply to the relay 19, opening the contact 14 thereof. When the press-to-talk switch 1 or 2 is released, the time delay circuit maintains a path for the current to ground for a predetermined time internal, after which the contacts 14 are released to close again.

The second relay 15 has its contacts 16 arranged so that alternative connections are made from the press-to-talk switches 1 and 2 to the line 3 or to a bypass line 11 which includes a protective diode D3 and which is connected in series with the coil of the second relay 15.

In use, while no signal carrier is being received by the receiver portion of the transceiver, the line between the press-to-talk switches 1 and 2 and the transmit-enable circuit 8 remains closed, and operation of either of the press-to-talk switches will operate the transmit-enable circuit, thereby causing the transmitter to function. If signal carrier is received by the receiver portion of the transceiver, the noise signal passed along the input line 5 is replaced by the carrier signal and, as hereinbefore explained, this causes the relay driver to close the circuit from the aircraft power supply at 28 volts, through the coil of the second relay 15, the contacts 14 of the first relay to ground, thereby energising the coil of the second relay and opening the circuit established by the contacts 16 between the press-to-talk switches 1 and 2 and the line 3. Operatin of either of the press-to-talk switches 1 and 2 while carrier is detected will therefore not operate the transmit-enable circuit 8 (FIG. 1).

An over-ride facility is provided by the combination of the relay 19, the time delay circuit, and the bypass line 11. When a press-to-talk switch 1 or 2 is closed, the contacts 14 of the relay 19 are opened, thus disconnecting the relay driver from the relay 15, and are held open for a predetermined time delay (e.g. about 1 second), after the press-to-talk switch is released, by the time delay circuit. However, the contacts 16 are not released by the relay 15, re-establishing the connection between the press-to-talk switches 1 and 2 and the transmit-enable circuit 8 because, while the press-to-talk switch is closed, a path to ground is established from the 28 volt power supply through the coil of the relay 15, via the bypass line 11, and through the contacts 16 in their open position. Thus, the transmitter can still not be operated by the press-to-talk switches. When the press-to-talk switch is released, since the time delay circuit holds the contacts 14 open for a predetermined time period, the relay 15 is de-energised and the path between the press-to-talk switches 1 and 2 and the transmit-enable circuit 8 is re-established only becoming broken again when the time delay circuit permits the contacts 14 to close and the presence of a carrier signal at 5 causes the coil of the relay 15 to become re-energised. It will therefore be seen that any further operation of either of the press-to-talk switches 1 and 2 during the time delay period while the contacts 14 of the first relay 19 are open will succeed in operating the transmit-enable circuit, and the contacts 14 cannot become closed again until the press-to-talk switch is released because the current passing from the power supply through the coil of the relay 19 and via the diode D1 to the press-to-talk switch, and thence to ground, holds the contacts open.

Referring to FIG. 3, the noise amplifier 12 and carrier squelch gate 13 require two electrical circuits of conventional design, similar to or identical with noise amplifier and carrier squelch gate circuits found within ARINC-type transceivers. The circuit is powered by a 16 volt DC regulated supply which is in turn powered from the 28 volt supply within the aircraft. The design of such a power supply will be familiar to anyone skilled in the art and will therefore not be described in detail. The values of the components of the circuits, which are illustrated in conventional form in FIG. 3, are as follows:

R31 3.9 kΩ 5%
R32 4.7 kΩ 5%
R33 4.7 kΩ 5%
R34 10 kΩ 5%
R35 and R35 470Ω
R37 1.8 kΩ 5%
R38 1 kΩ
R39 10 kΩ
C32 0.0018 μF 200 volts
C32' 0.022 μF 80 v
C33 220 pF
C34 and C35 1 μF 35 v
C36 0.0033 μF 80 v
C37 2.2 μF 20 v
C38 15 μF 20 v
CR31 1N-4009
Q31 and Q32 2N2925
RT31 1 kΩ 10%

Figure 4:
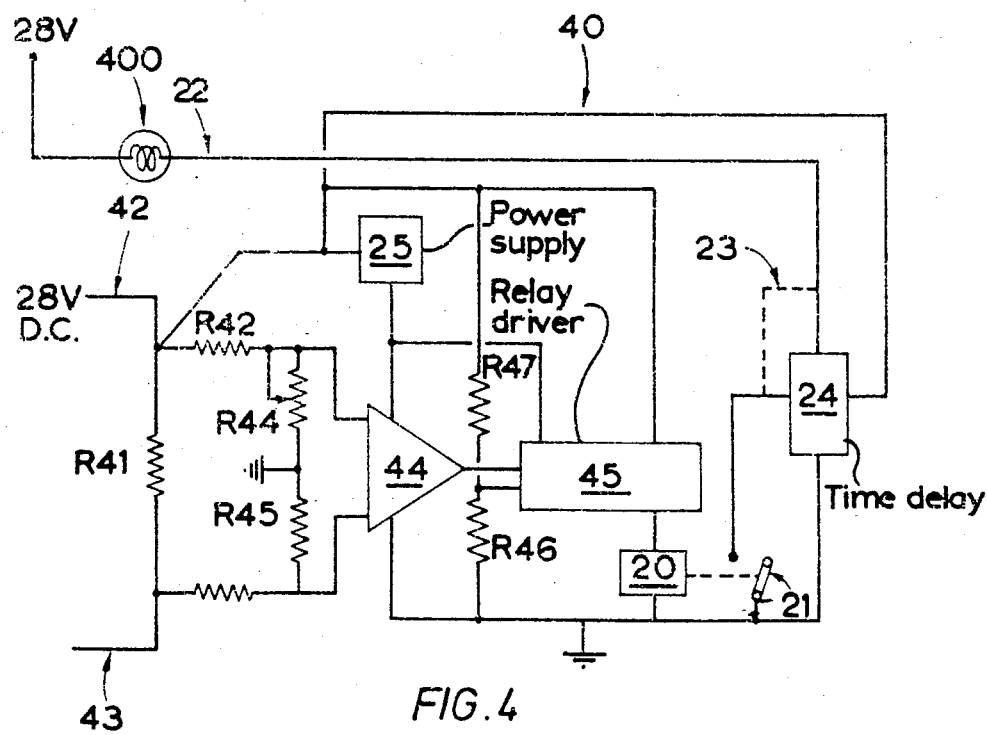
FIG. 4 is a circuit diagram of a second part of the preferred apparatus of the invention.

Referring to FIG. 4, a further function of the apparatus in accordance with the invention is to warn an operator of a transceiver of the type described when a preset time interval has elapsed in the transmit mode, thereby reducing the incidence of accidental and unintentional transmissions blocking an operational frequency. The circuitry 40 for this part of the apparatus is based on the fact that all transceivers draw a greater electrical current when transmitting than when receiving.

Line 42 is connected to the power source for the transceiver, the aircraft 28 volt DC power supply. Line 43 is connected to the transceiver power input. Thus the circuitry is connected between the power supply and the transceiver. The transceiver supply current is therefore routed through a low value resistor R41 (e.g. 0.01 ohms 5 watt 15 amp rating). The voltage drop across this resistor R41 is directly proportional to the current through it and this voltage differential is detected and amplified by differential amplifier 44 (SN72720N or equivalent) connected to either side of the low value resistor R41 through respective resistors R42 and R43 (each 100 kΩ). The differential amplifier and its associated circuitry thus serve as a current monitoring means.

The output from the differential amplifier 44 is passed to warning means including a commercially-available relay driver 45 (DS3686N or equivalent), for which resistors R46 (350Ω) and R47 (2.5 kΩ), connected respectively to ground and to the 28 V supply, give a reference voltage.

In the receive mode of the transceiver, the voltage differential across the low value resistor R41, amplified by the differential amplifier 44, is below the threshold, adjustably determined by the bridge formed by variable resistor R44 (1 kΩ) and fixed resistor R45 (1 kΩ), to cause the relay driver 45 to energise the relay 20, which thus remains de-energised with the contacts 21 thereof open. The contacts 21 are interposed between a commercially-available time delay 24 (Series 6100-1402 by HI-G Inc. Connecticut, U.S.A.) and ground, the time delay 24 being connected by a line 22 to a warning device such as a light 400 which in turn is connected to the power supply. Alternatively, an audible warning device may be used, or a combination of the two.

The power supply for the differential amplifier 44 and the relay driver 45 is a regulated power supply 25, of conventional design, connected to the 28 volt DC aircraft power supply via line 42.

When the transceiver is switched to the transmit mode, the current through the resistor R41 increases, thus increasing the voltage differential across the differential amplifier 44. The output of the amplifier 44 is thereby raised to a level where the relay driver 45 is caused to energise the relay 20. The contacts 21 are therefore closed, supplying a ground signal which causes the time delay 24 to operate and, after a predetermined time, to allow current to flow in line 22, thereby operating the warning light 400.

In a simpler embodiment of the invention, the delay 24 is omitted, the connection to ground via contacts 21 taking the route effectively indicated by the broken line 23. In this simpler embodiment, the warning light will illuminate whenever the transmitter portion of the transceiver is operating.

However, in most circumstances, it will be preferred to incorporate the delay so that warning is only given when the transmission time becomes unduly extended. This may happen, for example, when a press-to-talk switch as hereinbefore described becomes stuck in a closed position, either through a fault in the switch, or through inadvertant pressure in the switch. A warning will indicate to the operator that the transmitter is operating and will enable him to take action promptly to prevent other transmissions on the same frequency being blocked.

I claim:

1. In a simplex radio transmitting and receiving apparatus comprising a selector switch means, operation of which causes the apparatus to change from a receiving mode into a transmitting mode, transmission blocking means arranged to prevent selection of the transmitting mode if a signal of predetermined strength is being received by the apparatus at the time the selector switch means is operated, and an over-ride circuit whereby operation of the transmission blocking means may be selectively over-ridden to enable the transmitting mode to be selected, the improvement which comprises means within said over-ride circuit responsive to a control signal generated by said selector switch means to initiate operation of said over-ride circuit, and means within said over-ride circuit responsive to return of said selector switch means to select the receiving mode of the apparatus to terminate operation of said over-ride circuit.

2. Apparatus as claimed in claim 1, wherein said means within said over-ride circuit responsive to the control signal is adapted to respond to repeated operation of said selector switch means within a predetermined time interval.

3. Apparatus as claimed in claim 1, wherein said selector switch means comprises a plurality of selector switches electrically connected in parallel.

4. In a simplex radio transmitting and receiving apparatus, comprising a selector switch, operation of which causes the apparatus to change from a receiving mode into a transmitting mode, transmission blocking means arranged to prevent selection of the transmitting mode if a signal of predetermined strength is being received by the apparatus at the time the selector switch is operated, and an over-ride circuit to cause the operation of the transmission blocking means of preventing transmission mode selection to be selectively over-ridden to enable the transmitting mode to be selected, the improvement which comprises means for generating a control signal, means within said over-ride circuit responsive to said control signal to initiate operation of said over-ride circuit, and means within said over-ride circuit responsive to return of said selector switch to select the receiving mode of the apparatus to terminate operation of said over-ride circuit.

5. Apparatus as claimed in claim 4, wherein the means for generating a control signal comprises an over-ride switch adjacent to said selector switch.

6. Transmission control means for a radio transmitting and receiving apparatus having a transmitter circuit and a receiver circuit, the apparatus comprising:
   a transmit press-switch coupled to a transmitter control circuit, operation of the press-switch causing the transmitter control circuit to operate to select operation of the transmitter circuit of the apparatus;
   a switching means connected between the transmit press-switch and the transmitter control circuit;
   a detector connected to the receiver circuit of said apparatus, the detector being operably connected to said switching means and arranged to detect receipt of a signal by the receiver circuit, whereby when a signal is detected the detector causes the switching means to open the circuit between the press-switch and the transmitter control circuit until said signal is no longer detected; and
   an over-ride circuit which comprises control signal detecting means, an over-ride control circuit, and mode-detecting means, the over-ride control circuit being activated by the control signal detecting means upon receipt of a control signal to over-ride operation of the switching means by the detector to close again the circuit between the press-switch and the transmitter control circuit, the mode-detecting means detecting the mode in which the apparatus is operating, and serving to de-activate the over-ride control circuit when a return to the receiving mode is detected.

* * * * *